United States Patent [19]

Firth, III et al.

[11] Patent Number: 4,520,371

[45] Date of Patent: May 28, 1985

[54] MULTI-ZONE THERMAL PRINT HEAD

[75] Inventors: Rowland V. D. Firth, III; Willie Goff, Jr.; Ta C. Ku, all of Austin; James M. Rakes, Leander, all of Tex.

[73] Assignee: International Business Machines Corporation, Armonk, N.Y.

[21] Appl. No.: 454,917

[22] Filed: Dec. 30, 1982

[51] Int. Cl.[3] .......... G01D 15/10

[52] U.S. Cl. .......... 346/76 PH

[58] Field of Search .......... 346/76 PH

[56] References Cited

U.S. PATENT DOCUMENTS

| | | | |
|---|---|---|---|
| 3,453,648 | 7/1969 | Stegenga | 346/76 |
| 3,855,448 | 12/1974 | Hanagata | 219/216 |
| 3,984,809 | 10/1976 | Dertouzos et al. | 346/76 R |
| 4,238,806 | 12/1980 | Bouio et al. | 346/76 PH |
| 4,242,565 | 12/1980 | Schoon | 219/216 X |
| 4,250,511 | 2/1981 | Stein et al. | 346/76 PH |
| 4,251,276 | 2/1981 | Ferree, Jr. et al. | 106/27 |
| 4,369,452 | 1/1983 | Anno et al. | 346/76 PH |
| 4,390,884 | 6/1983 | Applegate et al. | 346/139 C X |
| 4,394,092 | 7/1983 | Osmera et al. | 400/120 X |
| 4,405,929 | 9/1983 | Sugano | 346/76 PH |
| 4,417,257 | 11/1983 | Mitsui | 346/76 PH |
| 4,420,763 | 11/1983 | Cuel et al. | 346/139 R X |
| 4,423,425 | 12/1983 | Reese et al. | 346/76 PH |

OTHER PUBLICATIONS

"Thermal Ink-Transfer Printing", S. Nakaya, K. Murasugi, M. Kazama, and Y. Sekido, *SID* 81 *Digest,* pp. 40–44.

*Primary Examiner*—E. A. Goldberg
*Assistant Examiner*—Gerald E. Preston
*Attorney, Agent, or Firm*—J. F. Villella, Jr.; John L. Jackson

[57] ABSTRACT

A plurality of arrays of heating elements, forming printing zones, are arranged separated from each other a predetermined distance (SL) on a substrate along a line (X) transverse the media transport direction (Y). The heating elements in each zone are arranged parallel to the transport direction (Y). Mover elements sweep the head back and forth relative to print line, a distance of SL. Releasable backing element is formed by rollers and each printing zone, the length of which is SL, is associated with a roller. The backing-rollers are moved together with the head for urging the print media against the thermal transfer ribbon and the latter against the multi-zone thermal print head.

14 Claims, 4 Drawing Figures

MULTI-ZONE THERMAL PRINT HEAD

TECHNICAL FIELD

The present invention relates to a thermal printing system in general and to the design of a heat applying print head in particular.

In thermal transfer printing, ink material or the like is selectively transferred from a carrier such as a thermal transfer ribbon to a print media, which is usually ordinary paper, by applying thermal energy to localized areas of the ribbon. Thermal printing might be performed using one color only, usually black, or using a multi-colored ribbon for color printing containing, for instance, the three basic colors yellow, magenta, and cyan.

BACKGROUND ART

One example of a thermal print system is disclosed in U.S. Pat. No. 4,250,511, which uses a thermal transfer ribbon having arranged in a repeating series of stripes the three basic colors yellow, magenta, and cyan as well as black. The stripes are disposed perpendicular to the ribbon's direction of transport and they span the whole length of the print line, i.e., the whole print media width. The heat applying print head is formed by a strip of thermal elements arranged in a row transverse to the print media and ribbon transport direction. Each element is connected to a ground lead and to a selection lead. Control means selectively energizes the required leads for desired color transfer. The print media is pressed against the colored surface of the thermal ribbon by a page wide roller whose axis is parallel to the print line. The thermal ribbon itself is kept against and supported by the stationary arranged print head so that the print line is formed by the nip between the print head and the backing roller. Upon printing any one of the thermal elements may be energized to transfer a spot of a particular color of the color stripe which is at that instant over the head. To permit the deposit of any color at a given location on the print media, the ribbon is advanced at a faster rate than the print media.

For generating prints of higher quality more picture elements (pel) per given distance are necessary. The higher rate of pels (e.g., 100 pel per inch) requires smaller thermal elements, e.g., those covering an area of, for instance, 10 mils (254 micrometer). This obviously requires more leads per given area which makes the head much more difficult to manufacture.

In addition to the above, the formulation of the thermal transfer ribbon material is of great importance. That is there are basically two kinds of thermal ribbon: one ribbon uses wax as the transfer media and the other uses resin. With a wax type of ribbon less thermal energy is necessary for softening the material for transferring it to the print media, since wax has a lower softening temperature. Additionally, the time needed for cooling and drying on the print media is longer and the material tends to run. On the other hand, with a resin type of ribbon a higher temperature is necessary for melting the color material for transferring it to the right media, but the time required for cooling and hardening on the print media is shorter and the material does not run or smear. Consequently, for the higher resolution and faster printing a resin type ribbon is best suited.

With a page wide heat applying print head having one or two continuous rows of heating elements transverse to the print media transport direction, as shown in FIGS. 3 and 5 of the above-cited U.S. patent, problems arise in connection with condensing the heating elements. For higher print quality a higher pel number is required and thereafter, at the same time the number of heating elements and selecting leads would have to be increased. Due to considerations of dot to dot spacing and to minimum allowable lead widths the known continuous line area head must allow access to both sides of the array of heating elements and/or is restricted in its resolution by these considerations. Furthermore, only one or two lines of dots, much less than the height of a normal character, can be printed at a time.

DISCLOSURE OF THE INVENTION

The main objects of the present invention are to provide a thermal print head of higher resolution, greater printing speed and simpler design especially in driver circuitry.

These and other objects are accomplished in accordance with the invention by utilizing a plurality of arrays of heating elements, forming printing zones, separated from each other a predetermined distance on a substrate along a line transverse the media transport direction, the heating elements in each zone being arranged parallel to that transport direction and means for moving the substrate back and forth the distance between two adjacent print zones.

With the thus formed multi-zone thermal print head less heating elements are necessary and therefore, less complicated driver circuitry. The individual heating element can be made smaller and easier access to each element is provided since there is more space available for the conductor leads. This results in higher print resolution and faster printing, since many more than one or two rows of spots, as is the usual case, can be printed simultaneously. To print more than one print line at a time is also possible when, in accordance with one embodiment of the invention, the array height is chosen to equal the height of two print lines.

In accordance with the invention, the print zones are arranged adjacent to one edge of the substrate. With this design it is possible to separate the ribbon from the print media relatively soon after it has been printed.

Further advantageous embodiments of the invention are laid down in related subclaims and will be apparent from those and from the following detailed description.

BRIEF DESCRIPTION OF THE DRAWING

In the following the invention and its operation will be described in detail in connection with the accompanying drawing, showing an embodiment of the invention, in which.

BEST MODE FOR CARRYING OUT THE INVENTION

Figure 1:
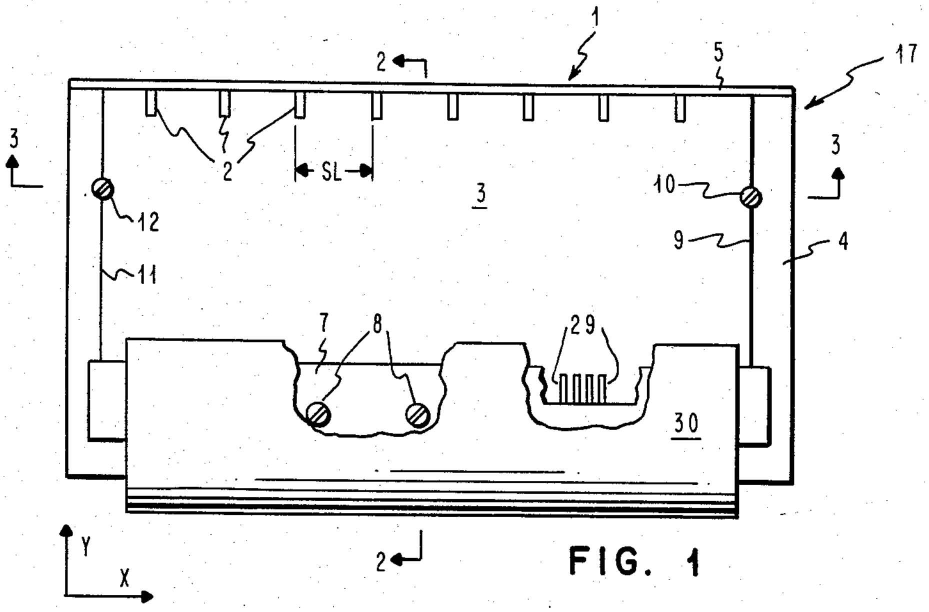
FIG. 1 is a view of the thermal print head showing several print zones.
Figure 2:
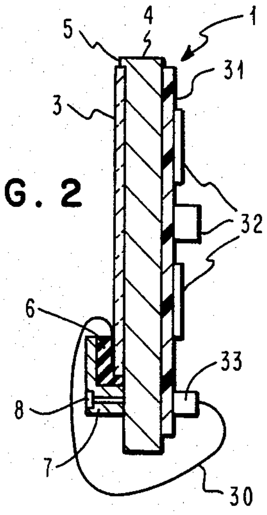
FIG. 2 is a sectional view taken along line 2—2 of FIG. 1.
Figure 3:
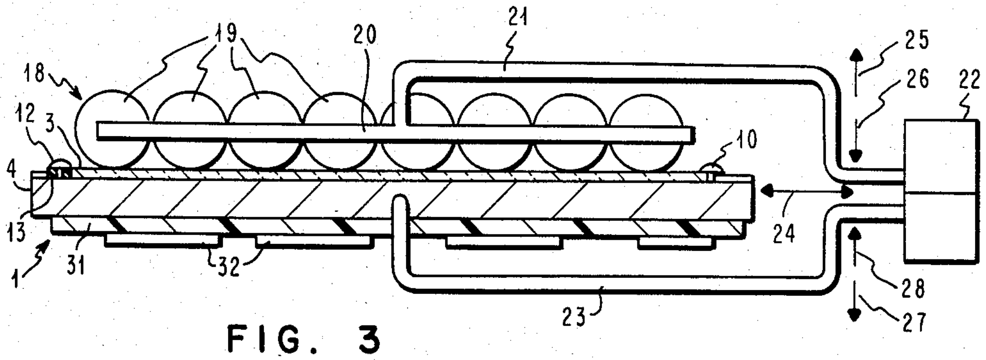
FIG. 3 is a sectional view taken along line 3—3 of FIG. 1 together with backing means associated with the head to clamp print media and thermal ribbon, both not shown, onto the print head, and furthermore, it shows moving and control means for the head.

The multi-zone thermal print head 1 in accordance with the invention is shown in a top view in FIG. 1 as well as in sectional views in FIGS. 2 and 3. Print zones 2 are formed on a substrate 3. The substrate 3 is made preferably from ceramic material, and fastened to a support platen 4. Support platen 4 which might serve as heat sink and is made out of an appropriate material, comprises a narrow registering stop 5 which raises from the surface of support 4 and may be implemented by the raised edge as shown in the Figure. The registering stop 5 spans the whole width of support platen 4 in the print line direction X, the latter being transverse to the transport direction Y of print media and thermal ribbon. Substrate 3 being flat rests on registering stop 5 and is slidingly urged against it by the elastic action of an elastomer 6. Elastomer 6 is pressed on the part of substrate 3 being opposite the print zone 2 by means of a clamp 7 and screws 8. For sliding registering in the direction Y on edge 9 of substrate 3 a shoulder screw 10 or the like is provided, holding the substrate 3 down to support platen 4 and registering it. On the opposite edge 11 another shoulder screw 12 is arranged. However, this screw 12 is surrounded by an elastomer ring 13 urging substrate 3 against registering screw 10, best seen in FIGS. 1 and 3. By this design, adjustment is made to different thermal expansion coefficients of substrate and support platen material.

Figure 4:
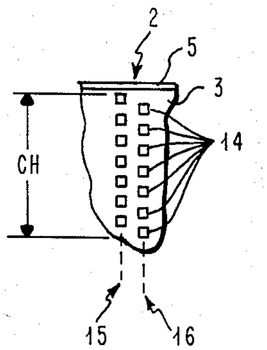
FIG. 4 is an enlarged view of one of the print zones of FIG. 1, this print zone formed by two columns of heating elements being staggered to each other.

The print zones 2 consists of arrays of heating elements 14. The heating elements 14 in each array are arranged in one or more rows or columns 15 or 16 respectively, as shown in FIG. 4. The columns 15, 16 are arranged parallel to the print media and thermal ribbon transport direction Y and parallel to substrate edges 9 and 11. For purpose of clarity, print media and thermal ribbon are not shown in the Figures. The arrays of heating elements 14 are separated from each other by a predetermined distance SL, the sweep length, in the direction along a line transverse to the media transport direction Y, or in other words, along a line being parallel to and even forming the print line, indicated by arrow 17 in FIG. 1. The embodiment shown comprises eight print zones, each distanced from the next one by the sweep length SL. Assuming the sweep length SL is chosen to be 2.54 cm (1 inch), in total about the normal A4 size page width could be imprinted upon by one print sweep of only the sweep length.

Reference is made to FIG. 3, which depicts a sectional view taken along line 3—3 of FIG. 1. Furthermore it shows backing means 18 provided for urging the print media against the color carrying side of the thermal transfer ribbon and the latter against print head 1 and especially against the print zones 2 on substrate 3. The backing means 18, as depicted, consists of a series of rollers 19, the axis of which are parallel to the print media transport direction Y. Each roller 19 is arranged opposite to and associated with a print zone 2, and is at least as wide as the print zone 2 is high, e.g., at least a character high CH (see FIG. 4) to cover the whole array of heat elements 14. The backing rollers 19 are, for example, made of a slightly resilient material like urethane and have a diameter as large as possible, i.e., a diameter of almost sweep length SL for making a large foot print.

Backing rollers 19 are mounted in one line to a frame 20 which itself is connected via an arm 21 to a drive and control unit 22. The mounting of rollers 19 to frame 20 can incorporate spring means for biasing the rollers against the print media. Thermal head 1 is also connected to said drive and control unit 22 via an arm 23 fixed to head support platen 4. Inside the drive and control unit 22 a precision lead screw drive or a stepping motor or the like may be provided for moving the print head 1 back and forth the sweep length SL in accordance with arrow 24 and in synchronism with backing means 18. As the print zones 2 are distanced for the sweep length SL, upon moving the print head 1 by this sweep movement the length of a whole print is covered. Furthermore, unit 22 comprises means actuated upon media and/or ribbon advancement for lifting in direction of arrow 25 and lowering in direction of arrow 26 the backing means 18 for releasing pressure from print media, ribbon and head 1 and for re-installing said pressure. Unit 22 might also be outfitted to lower arm 23 and the head 1 therewith in direction of arrow 27 or lift it in direction of arrow 28. The lift and lower movements of backing means 18 and head 1 could be performed in synchronism or independently from each other, dependent upon the print function and print mode selected and performed.

Each single heat element 14 of head 1 as shown in FIG. 4 is separately energizable. Therefore, it is connected to two leads. One lead, e.g., ground, might be a common lead for all heat elements in columns 15 or 16, or it might be even a common lead for both columns 15 and 16 arranged in the middle of both. The other lead is a selecting lead unique for each heating element 14. All leads are traced to connector pads 29 provided on the clamped edge of substrate 3. To these pads 29 individual leads of a first connector bus cable 30 are connected. This is done by means of clamping these leads to the surface while inserting the end of cable 30 between pads 29, elastomer 6, and clamp 7 which also fixes substrate 3 onto support platen 4. Cable 30 spans about the whole width of substrate 3 as appropriate.

To keep the connector leads between the heating elements 14 and its individual drive circuitry as short as possible, a circuit board 31 carrying driver circuitry 32 is fastened to support platen 4 on the side opposite to the substrate side. Cable 30 is plugged into a connector 33 on board 31 near the clamped edge of substrate 3. This circuit board 31 arranged to be movable with head 1 minimizes the number of necessary electrical connections between the translating head and stationary selection circuitry, not shown, as well as the number of wires which must be flexed as the head translates in direction of arrow 24.

The arrays of heating elements 14 may have different heights CH. For example, columns 15 and 16 could be made the height of a character of a first character font or the height of two characters and a line space of a second character font. Using two columns 15 and 16 of equally sized and distanced heating elements 14, the two columns being staggered in print media transport direction Y, a complete solid line of color spots can be printed by selectively energizing the desired heating elements 14. This design additionally allows printing with a higher density of picture elements.

By using manufacturing techniques well known from solid state integrated circuit technology the heating elements 14 are made of resistive material, and the connector leads can be provided in high density and very small size. For example, it is easily possible to have heating elements 14 of a square form with an edge length of about 125 micrometers (5 mils) and an equal distance between them and a distance of about 300 micrometers between the two columns 15 and 16 shown in FIG. 4. It is apparent that the individual leads can easily be connected on both sides of the printing zones 2 since the total area between the zones is available. Thus, the design of the present invention offers the possibility of producing and having a thermal print head with very high resolution. It offers, additionally, the possibility of positioning the print zones adjacent to an edge of the head thereby facilitating the almost immediate separation of print media and thermal ribbon following printing. As above discussed, the solution of this problem is of especial importance in color printing applications in which a resin based thermal transfer ribbon is used.

In summary, for printing the heating elements 14 are selectively energized by driver and selecting circuitry, not shown, and the head 1 is translated in direction X in a controlled, associated and appropriate movement to transfer spots of softened color material from the ribbon to the print media to form the desired characters. In accordance with the given height CH of the print zone 2 and the actual height of the character to be printed even more than one whole print line can be covered and be printed within one sweep motion. It is further possible to print another print line or another color after having advanced the print media and/or the ribbon on the reverse translation movement of head 1.

While this invention has been particularly shown and described with reference to a preferred embodiment thereof, it will be understood by those skilled in the art that foregoing and other changes in form and details may be made therein without departing from the spirit and scope of the invention.

We claim:

1. A heat applying print head in a thermal print apparatus for color transferring from a thermal ribbon onto a media, the head being arranged transverse (X) to the media transport direction (Y) and comprising selectively controllable heating elements, said print head comprising:

a plurality of arrays of heating elements each one of said plurality of arrays forming a printing zone, said plurality of arrays thereby forming a plurality of printing zones, said plurality of arrays arranged on a substrate substantially parallel to the media transport direction (Y), each of said plurality of arrays of heating elements having a height (CH) at least equal to the height of one complete character to be printed, said plurality of printing zones separated from each other a distance (SL) along a line (X) transverse to said media transport direction (Y); and, means for moving said substrate back and forth over said predetermined distance (SL) in the direction (X) transverse to the media transport direction (Y), whereby one or more complete characters are printed along said line (X) during each movement of said substrate over said predetermined distance (SL).

2. The heat applying print head of claim 1, wherein said plurality of printing zones are arranged adjacent to one edge of said substrate.

3. The heat applying print head of claim 1, wherein said plurality of arrays of heating elements in each of said printing zones are arranged in two columns staggered relative to each other.

4. The heat applying print head of claim 1, wherein said substrate is made of ceramic material.

5. The heat applying print head of claim 1, wherein said substrate is mounted on a support platen.

6. The heat applying print head of claim 5, wherein said support platen constitutes a heat sink.

7. The heat applying print head of claim 5, furthermore including means for slidingly fastening said substrate to said support platen for adjusting the position of said substrate to compensate for different thermal expansion coefficients of said substrate and said support platen.

8. The heat applying print head of claim 5, wherein a circuit board comprising driver circuitry for supplying power to the resistive heating elements is mounted onto said support platen opposite to said substrate.

9. The heat applying print head of claim 8, wherein said heating elements on said substrate are connected with said driver circuitry on said board by a flat connector bus cable.

10. The heat applying print head of claim 1 wherein said moving means further comprises backing means associated with each of said printing zones for urging said media against said thermal ribbon and the latter against said array of heating elements.

11. The heat applying print head of claim 10, wherein said backing means comprises a series of rollers, each of said series of rollers separated from each other by said predetermined distance (SL) along said line (X), the axis of said series of rollers parallel to the media transport direction (Y).

12. The heat applying print head of claim 11, wherein said backing means is connected to a drive for driving said substrate back and forth transverse to said media transport direction (Y).

13. The heat applying print head of claim 11, wherein said series of rollers is biased by means of springs against said media.

14. The heat applying print head of claim 10, wherein said backing means is retractably mounted from said media, retractable movement effected by means of an actuator for releasing the pressure from said media upon advancing said media or said ribbon.

* * * * *